United States Patent
Sakata et al.

(10) Patent No.: US 11,669,006 B2
(45) Date of Patent: Jun. 6, 2023

(54) LIGHT GUIDING UNIT, LIGHT SOURCE APPARATUS, AND PROJECTOR

(71) Applicant: SEIKO EPSON CORPORATION, Tokyo (JP)

(72) Inventors: Hidefumi Sakata, Tatsuno-machi (JP); Yuichiro Iwama, Azumino (JP)

(73) Assignee: Seiko Epson Corportation, Tokyo (JP)

( * ) Notice: Subject to any disclaimer, the term of this patent is extended or adjusted under 35 U.S.C. 154(b) by 0 days.

(21) Appl. No.: 17/463,634

(22) Filed: Sep. 1, 2021

(65) Prior Publication Data
US 2022/0066307 A1    Mar. 3, 2022

(30) Foreign Application Priority Data
Sep. 1, 2020   (JP) .............................. JP2020-146820

(51) Int. Cl.
*G03B 21/20*   (2006.01)
*F21V 8/00*    (2006.01)

(52) U.S. Cl.
CPC ......... *G03B 21/208* (2013.01); *G02B 6/0006* (2013.01); *G02B 6/0008* (2013.01); *G03B 21/204* (2013.01); *G03B 21/2066* (2013.01)

(58) Field of Classification Search
CPC ............... G03B 21/208; G03B 21/204; G03B 21/2066; G03B 21/2013; G02B 6/0006; G02B 6/0008; G02B 2207/113; G02B 6/005; G02B 19/0028; G02B 27/102; G02B 27/149; G02B 6/0003
See application file for complete search history.

(56) References Cited

U.S. PATENT DOCUMENTS

| | | | | |
|---|---|---|---|---|
| 2006/0227570 A1* | 10/2006 | Rutherford | ............ | H04N 9/315 348/E9.027 |
| 2007/0280622 A1* | 12/2007 | Rutherford | .......... | G02B 6/0068 385/142 |
| 2016/0266297 A1* | 9/2016 | Hikmet | ................ | G02B 6/0075 |
| 2017/0315433 A1* | 11/2017 | Ronda | .................... | C04B 35/44 |
| 2018/0106460 A1* | 4/2018 | Van Bommel | ............ | F21V 9/08 |
| 2019/0250322 A1* | 8/2019 | Hwang | .................. | G02B 6/005 |
| 2020/0026172 A1 | 1/2020 | Sakata et al. | | |

(Continued)

FOREIGN PATENT DOCUMENTS

| | | |
|---|---|---|
| CN | 110737163 A | 1/2020 |
| JP | 2006-330492 A | 12/2006 |

(Continued)

*Primary Examiner* — Magda Cruz
(74) *Attorney, Agent, or Firm* — Dority & Manning, P.A.

(57) ABSTRACT

A light guiding unit includes a light guiding member that light enters and an angle converter that the light from the light guiding member enters. The light guiding member has a side surface and a light exiting end surface which intersects the side surface and via which the light exits. The angle converter includes a light incident section on which the light from the light guiding member is incident, a light exiting section via which the light incident on the angle converter exits, and a reflection section that reflects the light incident via the light incident section toward the light exiting section. The refractive index of the interior of the angle converter is greater than the refractive index of air. The refractive index of the interior of the light guiding member is greater than the refractive index of the interior of the angle converter.

9 Claims, 6 Drawing Sheets

(56) References Cited

U.S. PATENT DOCUMENTS

| | | | |
|---|---|---|---|
| 2020/0041885 A1* | 2/2020 | Peeters | G02B 6/0003 |
| 2020/0064722 A1* | 2/2020 | Suzuki | G03B 21/2066 |
| 2020/0066945 A1 | 2/2020 | Sakata | |
| 2020/0174177 A1* | 6/2020 | Okumura | H01L 33/505 |
| 2020/0201156 A1* | 6/2020 | Suzuki | H04N 9/3105 |
| 2020/0201157 A1* | 6/2020 | Suzuki | G02B 6/0003 |

FOREIGN PATENT DOCUMENTS

| | | |
|---|---|---|
| JP | 2016-537770 A | 12/2016 |
| JP | 2020-34884 A | 3/2020 |
| JP | 2020-95948 A | 6/2020 |
| WO | WO2019/233876 A | 12/2019 |

* cited by examiner

LIGHT GUIDING UNIT, LIGHT SOURCE APPARATUS, AND PROJECTOR

The present application is based on, and claims priority from JP Application Serial Number 2020-146820, filed Sep. 1, 2020, the disclosure of which is hereby incorporated by reference herein in its entirety.

BACKGROUND

1. Technical Field

The present disclosure relates to a light guiding unit, a light source apparatus, and a projector.

2. Related Art

There has been a light source apparatus in which an angle converter is provided on the light exiting side of a light guiding rod including a wavelength conversion member to change the light exiting angle for improvement in the light extraction efficiency of the light guiding rod (see JP-T-2016-537770, for example).

In the light source apparatus described above, since the refractive index of the angle converter is smaller than the refractive index of the light guiding rod, part of the light having exited out of the light guiding rod is disadvantageously totally reflected off the interface between the light guiding rod and the angle converter. The light source apparatus described above therefore has a problem of a decrease in the light utilization efficiency because the amount of light incident on the angle converter decreases.

SUMMARY

To solve the problem described above, a first aspect of the present disclosure provides a light guiding unit including a light guiding member that light enters and an angle converter that the light from the light guiding member enters. The light guiding member has a side surface and a light exiting end surface which intersects the side surface and via which the light exits. The angle converter includes a light incident section on which the light from the light guiding member is incident, a light exiting section via which the light incident on the angle converter exits, and a reflection section that reflects the light incident via the light incident section toward the light exiting section. A refractive index of an interior of the angle converter is greater than a refractive index of air. A refractive index of an interior of the light guiding member is greater than the refractive index of the interior of the angle converter. The light exiting end surface and part of the side surface are in contact with the angle converter.

A second aspect of the present disclosure provides a light source apparatus including the light guiding unit according to the first aspect of the present disclosure and a light source that outputs light to the light guiding member.

A third aspect of the present disclosure provides a projector including the light source apparatus according to the second aspect of the present disclosure, a light modulator that modulates light from the light source apparatus in accordance with image information, and a projection optical apparatus that projects the light modulated by the light modulator.

DESCRIPTION OF EXEMPLARY EMBODIMENTS

An embodiment of the present disclosure will be described below with reference to the drawings.

A projector according to the present embodiment is an example of a projector using a liquid crystal panel as a light modulator.

In the following drawings, components are drawn at different dimensional scales in some cases for clarification of each of the components.

Figure 1:
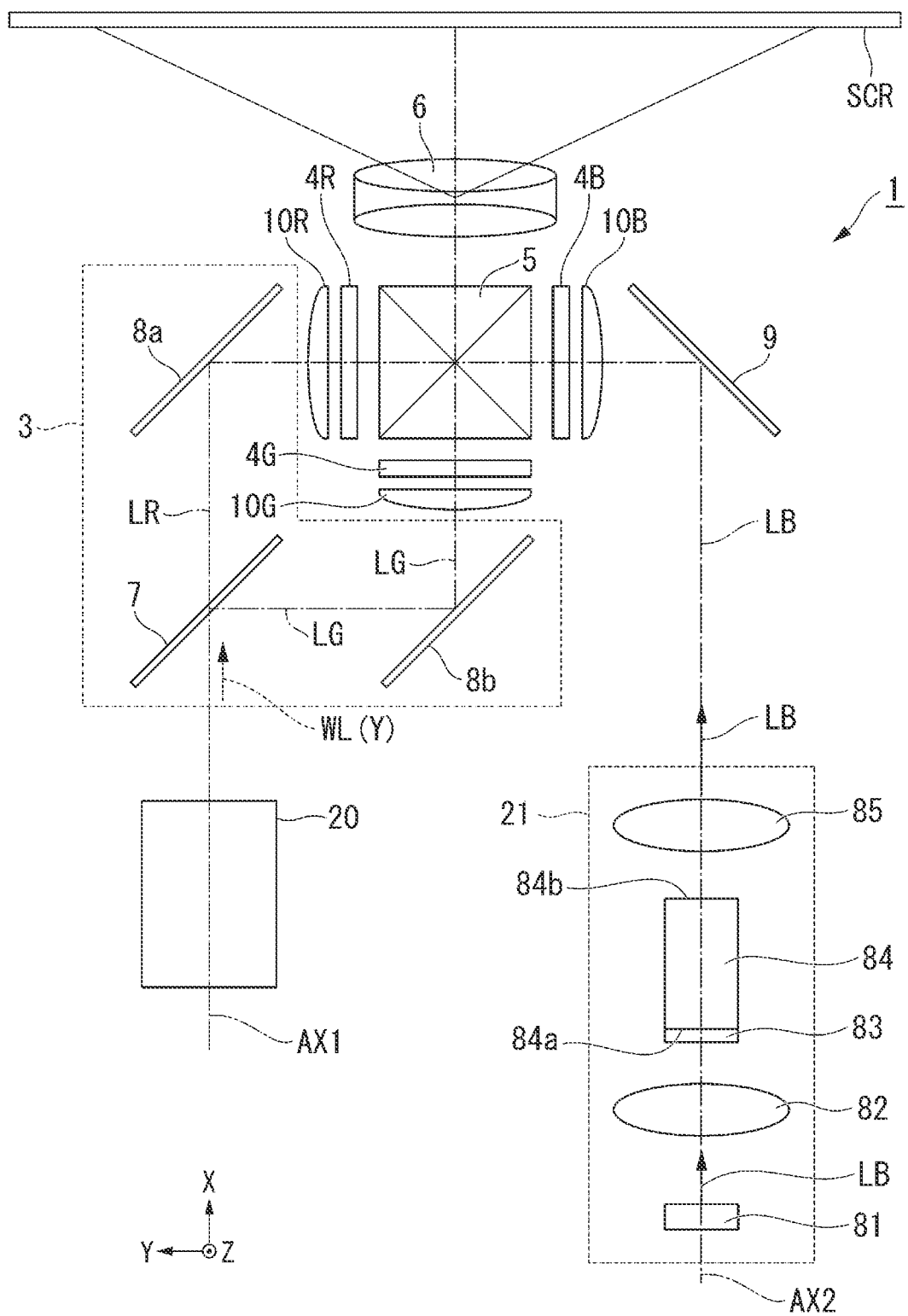
FIG. 1 shows the configuration of a projector according to an embodiment.

FIG. 1 shows the configuration of the projector according to the present embodiment.

A projector 1 according to the present embodiment shown in FIG. 1 is a projection-type image display apparatus that displays a color image on a screen SCR. The projector 1 uses three light modulators corresponding to color luminous fluxes, red light LR, green light LG, and blue light LB.

The projector 1 includes a first light source apparatus 20, a second light source apparatus 21, a color separation system 3, light modulators 4R, 4G, and 4B, a light combining system 5, and a projection optical apparatus 6. The first light source apparatus 20 corresponds to an embodiment of the light source apparatus according to the present disclosure.

The first light source apparatus 20 outputs yellow illumination light WL toward the color separation system 3. The second light source apparatus 21 outputs blue light LB toward the light modulator 4B. Detailed configurations of the first light source apparatus 20 and the second light source apparatus 21 will be described later.

Description with reference to FIG. 1 and subsequent figures will be made by using an XYZ orthogonal coordinate system as required. The axis Z is an axis extending along the upward/downward direction of the projector 1, the axis X is an axis parallel to an optical axis AX1 of the first light source apparatus 20 and an optical axis AX2 of the second light source apparatus 21, and the axis Y is an axis perpendicular to the axes X and Z.

The color separation system 3 separates the yellow illumination light WL into the red light LR and the green light LG. The color separation system 3 includes a dichroic mirror 7, a first reflection mirror 8a, and a second reflection mirror 8b.

The dichroic mirror 7 separates the illumination light WL from the first light source apparatus 20 into the red light LR and the green light LG. The dichroic mirror 7 transmits the separated red light LR and reflects the separated green light LG. The second reflection mirror 8b reflects the green light LG toward the light modulator 4G. The first reflection mirror 8a is disposed in the optical path of the red light LR and reflects the red light LR having passed through the dichroic mirror 7 toward the light modulator 4R.

On the other hand, the blue light LB from the second light source apparatus 21 is reflected off a reflection mirror 9 toward the light modulator 4B.

The configuration of the second light source apparatus 21 will be described.

The second light source apparatus 21 includes a light source section 81, a focusing lens 82, a diffuser plate 83, a rod lens 84, and a relay lens 85. The light source section 81 is formed of at least one semiconductor laser and outputs the blue light LB formed of laser light. The light source section 81 is not limited to a semiconductor laser and may be an LED that outputs blue light.

The focusing lens 82 is formed of a convex lens and causes the blue light LB to be incident on the diffuser plate 83 with the blue light LB substantially focused thereon. The diffuser plate 83 diffuses the blue light LB from the light source section 81 into blue light LB diffused by a predetermined degree to generate blue light LB having a uniform light orientation distribution close to that of the illumination light WL formed of fluorescent Y outputted from the first light source apparatus 20. The diffuser plate 83 can be formed, for example, of a ground glass plate made of optical glass.

The blue light LB diffused by the diffuser plate 83 enters the rod lens 84. The rod lens 84 has a quadrangular columnar shape extending along the optical axis AX2 of the second light source apparatus 21 and has a first end surface 84a provided at one end and a second end surface 84b provided at the other end. The diffuser plate 83 is fixed to the first end surface 84a of the rod lens 84 via an optical adhesive (not shown). It is desirable that the refractive index of the diffuser plate 83 match as much as possible with the refractive index of the rod lens 84.

The blue light LB propagates through the rod lens 84 while being totally reflected therein and exits via the second end surface 84b with the illuminance distribution uniformity of the blue light LB improved. The blue light LB having exited out of the rod lens 84 enters the relay lens 85. The relay lens 85 causes the blue light LB having the illuminance distribution uniformity improved by the rod lens 84 to be incident on the reflection mirror 9.

The second end surface 84b of the rod lens 84 has a rectangular shape substantially similar to the shape of an image formation area of the optical modulator 4B. The blue light LB having exited out of the rod lens 84 is thus efficiently incident on the image formation area of the light modulator 4B.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each, for example, a transmissive liquid crystal panel. A polarizer (not shown) is disposed on the light incident side and the light exiting side of each of the liquid crystal panels and configured to transmit only linearly polarized light polarized in a specific direction.

Field lenses 10R, 10G, and 10B are disposed on the light incident side of the light modulators 4R, 4G, and 4B, respectively. The field lenses 10R, 10G, and 10B parallelize the chief rays of the red light LR, the green light LG, and the blue light LB to be incident on the respective light modulators 4R, 4G, and 4B.

The light combining system 5 receives the image light outputted from the light modulators 4R, 4G, and 4B, combines the image light corresponding to the red light LR, the image light corresponding to the green light LG, and the image light corresponding to the blue light LB with one another, and outputs the combined image light toward the projection optical apparatus 6. The light combining system 5 is formed, for example, of a cross dichroic prism.

The projection optical apparatus 6 is formed of a plurality of lenses. The projection optical apparatus 6 enlarges the combined image light from the light combining system 5 and projects the enlarged image light toward the screen SCR. An image is thus displayed on the screen SCR.

The configuration of the first light source apparatus 20 will subsequently be described.

Figure 2:
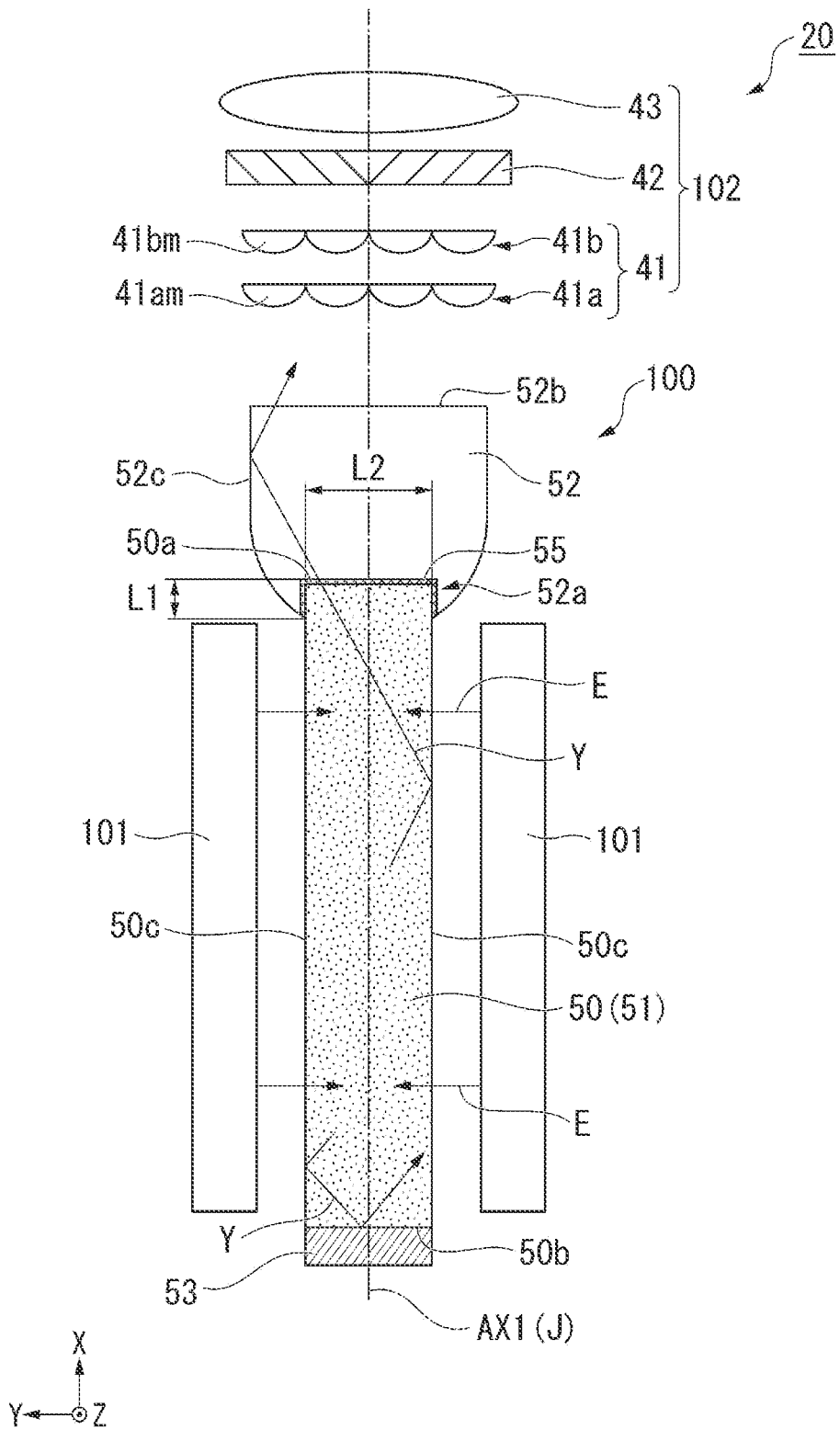
FIG. 2 is a schematic configuration diagram of a first light source apparatus.

FIG. 2 is a schematic configuration diagram of the first light source apparatus 20.

The first light source apparatus 20 includes a light guiding unit 100, light sources 101, and an illumination homogenizing optical system 102, as shown in FIG. 2. The light guiding unit 100 includes a light guiding member 51, an angle converter 52, and a mirror 53. The light sources 101 output blue excitation light E toward the light guiding unit 100. The light sources 101 each include LEDs that output the blue excitation light E and may each include not only the LEDs but other optical members, such as a light guiding plate, a diffuser plate, and a lens. The number of LEDS is not limited to a specific number.

The light guiding member 51 in the present embodiment is formed of a wavelength conversion member 50, which converts the excitation light E incident from the light sources 101 into light having a wavelength band different from that of the excitation light E. The wavelength conversion member 50 has, for example, a quadrangular columnar shape extending in the axis-X direction.

The wavelength conversion member 50 has a first end surface 50a and a second end surface 50b, which face each other, and four side surfaces 50c, which intersect the first end surface 50a and the second end surface 50b. The first end surface 50a and the second end surface 50b each have, for example, a 1-mm-square quadrangular shape.

The wavelength conversion member 50 at least contains a phosphor and converts the excitation light E having an excitation wavelength band into the fluorescence Y having a second wavelength band different from a first wavelength band to which the excitation wavelength belongs. The excitation light E enters the wavelength conversion member 50 via the side surfaces 50c, and the fluorescence Y exits out of the wavelength conversion member 50 via the first end surface 50a. That is, the first end surface 50a corresponds to a light exiting end surface via which the light in the wavelength conversion member 50 exits.

The wavelength conversion member 50 does not necessarily have a quadrangular columnar shape and may instead have a triangular or other polygonal columnar shape. The wavelength conversion member 50 may still instead have a cylindrical shape.

The light sources 101 are so provided as to face the side surfaces 50c of the wavelength conversion member 50 and output the excitation light E toward the side surfaces 50c. The wavelength band of the excitation light E is, for example, a blue-violet wavelength region ranging from 400 to 480 nm and has a peak wavelength of, for example, 445 nm. The light sources 101 may be so provided as to face some or all of the four side surfaces 50c of the wavelength conversion member 50.

The wavelength conversion member 50 contains a ceramic phosphor (polycrystal phosphor) that converts the excitation light E in terms of wavelength into the fluorescence Y. The wavelength band of the fluorescence Y is, for example, a yellow wavelength region ranging from 490 to 750 nm. That is, the fluorescence Y is yellow light containing a red light component and a green light component.

The wavelength conversion member 50 may contain a single crystal phosphor in place of a polycrystal phosphor. The wavelength conversion member 50 may instead be made of fluorescent glass. Still instead, the wavelength conversion member 50 may be formed of a binder which is made of glass or resin and in which a large number of phosphor particles are dispersed. The wavelength conversion member 50 made of the material described above converts the excitation light E into the fluorescence Y having the wavelength band described above.

Specifically, the material of the wavelength conversion member 50 contains, for example, an yttrium-aluminum-garnet-based (YAG-based) phosphor. Consider YAG:Ce, which contains cerium (Ce) as an activator by way of example, and the wavelength conversion member 50 can be made, for example, of a material produced by mixing raw powder materials containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The mirror 53 is provided at the second end surface 50b of the wavelength conversion member 50. The mirror 53 reflects the fluorescence Y having been guided through the wavelength conversion member 50 and having reached the second end surface 50b. The mirror 53 is formed of a metal film or a dielectric multilayer film formed on the second end surface 50b of the wavelength conversion member 50.

In the first light source apparatus 20 having the configuration described above, when the excitation light E outputted from the light sources 101 enters the wavelength conversion member 50, the phosphor contained in the wavelength conversion member 50 is excited, and the fluorescence Y emits from the phosphor. The fluorescence Y travels omni-directionally from light emission points, and the fluorescence Y traveling toward the side surfaces 50c are totally reflected off the side surfaces 50c and travels toward the first end surface 50a or the second end surface 50b while repeatedly totally reflected. The fluorescence Y traveling toward the first end surface 50a enters the angle converter 52. On the other hand, the fluorescence Y traveling toward the second end surface 50b is reflected off the mirror 53 and travels toward the first end surface 50a.

Out of the excitation light E having entered the wavelength conversion member 50, a portion of the excitation light E that is the portion not having been used to excite the phosphor is reflected off the mirror 53 provided at the second end surface 50b and is therefore confined in the wavelength conversion member 50 and reused.

The angle converter 52 is provided on the light exiting side of the first end surface 50a of the wavelength conversion member 50. In the present embodiment, the angle converter 52 is formed of a compound parabolic concentrator (CPC). The angle converter 52 includes a light incident section 52a, on which the fluorescence Y emitted from the wavelength conversion member 50 is incident, a light exiting section 52b, via which the fluorescence Y exits, and a reflection section 52c, which reflects the fluorescence Y incident via the light incident section 52a toward the light exiting section 52b.

In the present embodiment, the angle converter 52 has a cross-sectional area that is perpendicular to an optical axis J and increases in the direction from the light incident section 52a toward the light exiting section 25b, which is the light traveling direction. That is, the cross-sectional area of the light exiting section 52b is greater than the cross-sectional area of the light incident section 52a. The cross section of the reflection section 52c taken along a plane containing the optical axis J is formed of a parabolic surface. The optical axis J of the angle converter 52 coincides with the optical axis AX1 of the first light source apparatus 20. In the present embodiment, the refractive index of the interior of the angle converter is greater than the refractive index of air. That is, the angle converter 52 has a solid structure made of a material having a refractive index greater than that of air, such as glass.

The fluorescence Y having entered the angle converter 52 changes its orientation while traveling in the angle converter 52 in such a way that the direction of the fluorescence Y approaches the direction parallel to the optical axis J whenever the fluorescence Y is totally reflected off the reflection section 52c. The angle converter 52 thus causes the fluorescence Y to exit out thereof while suppressing the internal total reflection at the light exiting section 52b by reducing the exiting angle of the fluorescence Y at the light exiting section 52b.

In the present embodiment, part of the wavelength conversion member 50 is buried in the light incident section 52a of the angle converter 52. Specifically, the first end surface (light exiting end surface) 50a and part of the side surfaces 50c of the wavelength conversion member 50 are buried in the light incident section 52a. That is, the first end surface (light exiting end surface) 50a and part of the side surfaces 50c are in contact with the angle converter 52. The term "in contact" used herein includes not only the state in which the wavelength conversion member 50 is in direct contact with the angle converter 52 but the state in which the wavelength conversion member 50 is bonded to the angle converter 52 via, for example, an optical adhesive (adhesive member) 55.

Figure 3:
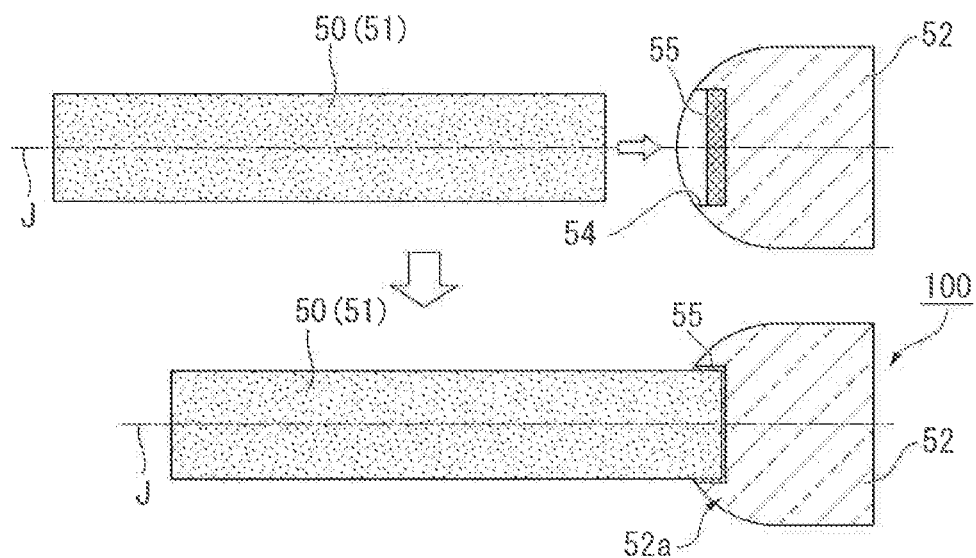
FIG. 3 shows the step of manufacturing a light guiding unit.

FIG. 3 shows the step of manufacturing the light guiding unit 100. Specifically, FIG. 3 shows the step of joining the wavelength conversion member 50 to the angle converter 52 with the optical adhesive 55.

First, the angle converter 52 is so prepared that an appropriate amount of optical adhesive 55 is poured into a recess 54 formed in the light incident section 52a, as shown in FIG. 3. The wavelength conversion member 50 is then inserted into the recess 54 into which the appropriate amount of optical adhesive 55 has been poured, and then the optical adhesive 55 is cured. The light guiding unit 100 having the configuration described above, in which part of the light guiding member 51 is buried in the angle converter 52, can thus be readily manufactured. In the light guiding unit 100 according to the present embodiment manufactured as described above, the optical adhesive 55 forms at least part of the light incident section 52a of the angle converter 52.

In the present embodiment, the refractive indices of the wavelength conversion member 50 and the angle converter 52 differ from each other. Specifically, the refractive index of the interior of the wavelength conversion member 50 is greater than the refractive index of the interior of the angle converter 52.

It is desirable that the refractive indices of the optical adhesive 55 and the angle converter 52 coincide with each other or that the refractive index of the optical adhesive 55 has a value at least between the refractive index of the interior of the light guiding member 51 and the refractive index of the interior of the angle converter 52. The configuration described above reduces optical loss due to reflection of the light at the interface between the wavelength conversion member 50 or the angle converter 52 and the optical adhesive 55.

Figure 4A:
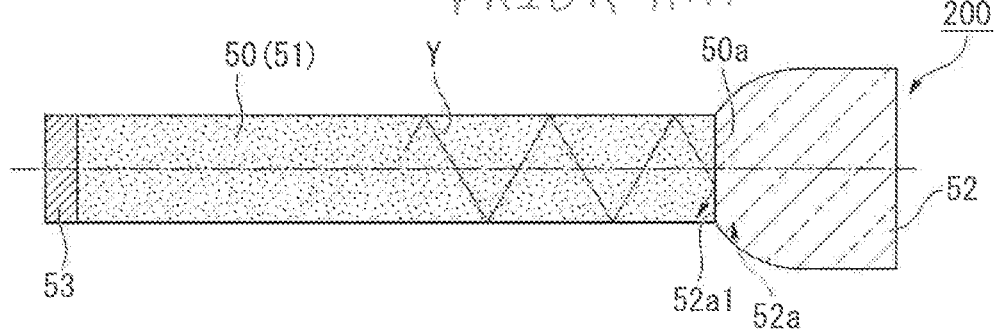
FIG. 4A shows the configuration of a light guiding unit according to Comparative Example.
Figure 4B:
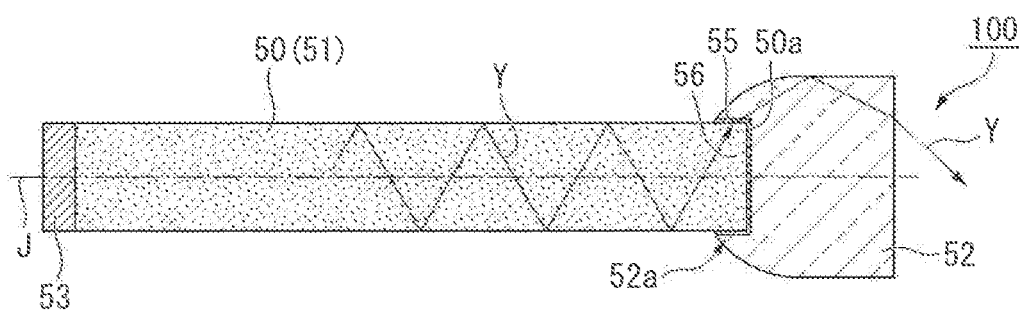
FIG. 4B shows the configuration of the light guiding unit according to the embodiment.

The effect of the configuration of the present embodiment will be described with reference to Comparative Example having a structure in which the wavelength conversion member is not buried in the light incident section of the angle converter. FIG. 4A shows the configuration of Comparative Example, and FIG. 4B shows the configuration of the present embodiment. In the description of the configuration of Comparative Example, components and members common to those in the present embodiment have the same reference characters.

In a light guiding unit 200 according to Comparable Example, the wavelength conversion member 50 is joined to an end surface 52a1 of the light incident section 52a of the angle converter 52, as shown in FIG. 4A. Part of the fluorescent Y having exited via the first end surface 50a of the wavelength conversion member 50 is reflected due to the difference in refractive index between the wavelength conversion member 50 and the angle converter 52 at the interface therebetween.

Since the refractive index of the interior of the wavelength conversion member 50 is greater than the refractive index of the interior of the angle converter 52, the fluorescence Y incident on the interface between the wavelength conversion member 50 and the angle converter 52 at an angle greater than or equal to the critical angle is totally reflected and returned into the wavelength conversion member 50. The light guiding unit 200 according to Comparative Example has only one interface between the wavelength conversion member 50 and the angle converter 52.

In contrast, in the present embodiment, part of the side surfaces 50c is buried in the light incident section 52a, as shown in FIG. 4B. That is, a buried section 56 of the side surfaces 50c of the wavelength conversion member 50 that is the section buried in the angle converter 52 is in contact with the angle converter 52, the refractive index of which is greater than that of air.

The critical angle for the light incident on the buried section 56 of the side surfaces 50c is greater than the critical angle for the light incident on the sections of the side surfaces 50c other than the buried section 56. Therefore, for example, consider light formed of components having angles greater than the critical angle when incident on the interface with air, and the angle of incidence of the light incident on the buried section 56 is not in some cases greater than the critical angle, whereby the light enters the angle converter 52 from the wavelength conversion member 50. Since the light guiding unit 100 according to the present embodiment includes the buried section 56 and therefore has four interfaces between the side surfaces 50c of the wavelength conversion member 50 and the angle converter 52, a larger amount of fluorescence Y enters the angle converter 52 than in the light guiding unit 200 according to Comparative Example.

As described above, the light guiding unit 100 according to the present embodiment, which includes the buried portion 56 as described above, allows an increase in the amount of fluorescence Y that enters the angle converter 52 as compared with the configuration of the light guiding unit 200 according to Comparative Example.

The relationship between a burying depth over which the buried section 56 is buried and the amount of fluorescence that exits out of the angle converter 52 will be described with reference to FIG. 5.

Figure 5:
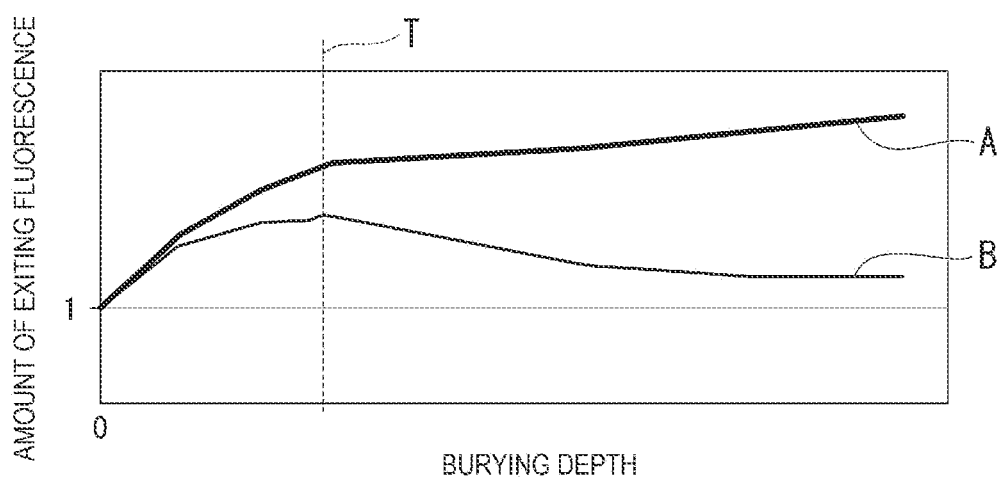
FIG. 5 shows the relationship between a burying depth and the amount of fluorescence.

In FIG. 5, the horizontal axis represents the burying depth, and the vertical axis represents the amount of exiting fluorescence. The amount of exiting fluorescence shown along the vertical axis is a relative value relative to the amount of exiting fluorescence in the configuration of Comparative Example set at one. In FIG. 5, the solid line labeled with the character A represents the total fluorescence that exits out of the angle converter 52, and the solid line labeled with the character B represents the fluorescence that falls within a predetermined angular range out of the total fluorescence that exits out of the angle converter 52. Note that the fluorescence having a predetermined angular distribution corresponds to the fluorescence having an angular distribution that allows the fluorescence to be caught by the illumination homogenizing optical system 102 disposed on the downstream of the light guiding unit 100. That is, the fluorescence having the angular distribution greater than the predetermined angle does not enter the illumination homogenizing optical system 102 or strays from the optical path, resulting in optical loss.

The solid line labeled with the character A in FIG. 5 shows that the amount of fluorescence that exits out of the angle converter 52 increases as the burying depth increases. The reason for this is that an increase in the burying depth increases the amount of fluorescence that directly enters the angle converter 52 via the buried section 56 (side surfaces 50c) accordingly.

The solid line labeled with the character B in FIG. shows that the amount of fluorescence having the predetermined angular distribution out of the fluorescence Y that exits out of the angle converter 52 increases in accordance with the burying depth until the burying depth reaches a predetermined value T. On the other hand, the solid line labeled with the character B in FIG. 5 shows that the amount of fluorescence having the predetermined angular distribution decreases at burying depths greater than the predetermined value T.

The reason for this is that when the burying depth exceeds the predetermined value T, the distance between the first end surface 50a of the wavelength conversion member 50 and the light exiting section 52b of the angle converter 52 becomes too short, so that part of the fluorescence Y having exited via the first end surface 50a is not reflected off the reflection section 52c but exits directly via the light exiting section 52b. That is, when the burying depth is set at the predetermined value T, the amount of light at a predetermined depth angle is maximized, whereby the fluorescence Y is allowed to enter the illumination homogenizing optical system 102 most efficiently.

In the light guiding unit 100 according to the present embodiment, a length L1 of the buried section 56 is so set as to be shorter than a length L2 of the first end surface 50a in consideration of the aforementioned relationship between the burying depth and the amount of exiting fluorescence. The wavelength conversion member 50 in the present embodiment has a 1-mm-square quadrangular columnar shape as described above, and the length L2 of the first end surface 50a is therefore 1 mm. That is, in the present embodiment, the length L1 of the buried section 56 is set at a value smaller than 1 mm. The length L1 of the buried section 56 is the length of a portion of the side surfaces 50c that is the portion in contact with the angle converter 52.

As described above, the light guiding unit 100 according to the present embodiment allows an increase in the amount of fluorescence Y extracted out of the light guiding unit 100 via the angle converter 52, as compared with the configuration of the light guiding unit 200 according to Comparative Example. Further, in the light guiding unit 100 according to the present embodiment, setting the burying depth of the buried section 56 at an optimum value allows the fluorescence Y having exited out of the angle converter 52 to efficiently enter the illumination homogenizing optical system 102.

The fluorescence Y having exited out of the angle converter 52 of the light guiding unit 100 enters the illumination homogenizing optical system 102, as shown in FIG. 2. The illumination homogenizing optical system 102 includes an optical integration system 41, a polarization converter 42, and a superimposing lens 43.

The optical integration system 41 is formed, for example, of a lens array 41a and a lens array 41b. The lens array 41a includes a plurality of first lenslets 41am, which divide the fluorescence Y from the angle converter 52 into a plurality of sub-luminous fluxes.

The plurality of first lenslets 41am are arranged in a matrix in a plane parallel to the plane YZ perpendicular to the optical axis AX1 of the first light source apparatus 20. The first lenslets 41am each have a rectangular shape substantially similar to the shape of the image formation area of each of the optical modulators 4R and 4G. The sub-luminous fluxes having exited out of the lens array 41a are thus each efficiently incident on the image formation area of each of the light modulators 4R and 4G.

The lens array 41b includes a plurality of second lenslets 41bm corresponding to the plurality of first lenslets 41am in the lens array 41a. The lens array 41b along with the superimposing lens 43 brings images of the first lenslets 41am of the lens array 41a into focus in the vicinity of the image formation area of each of the light modulators 4R and 4G. The plurality of second lenslets 41bm are arranged in a matrix in a plane parallel to the plane YZ perpendicular to the optical axis AX1 of the first light source apparatus 20.

The fluorescence Y having passed through the optical integration system 41 enters the polarization converter 42. The polarization converter 42 converts the polarization direction of the light having exited out of the optical integration system 41. Specifically, the polarization converter 42 converts sub-luminous fluxes into which the lens array 41a divides the fluorescence Y and which exit out of the lens array 41b into linearly polarized luminous fluxes. The polarization converter 42 includes a polarization separation layer that directly transmits one of linearly polarized light components contained in the fluorescence Y and reflects another one of the linearly polarized light components in a direction perpendicular to the optical axis, a reflection layer that reflects the other linearly polarized light component reflected off the polarization separation layer in the direction parallel to the optical axis, and a retardation film that converts the other linearly polarized light component reflected off the reflection layer into the one linearly polarized light component.

The fluorescence Y having passed through the polarization converter 42 enters the superimposing lens 43. The superimposing lens 43, in cooperation with the optical integration system 41, forms the illumination homogenizing optical system that homogenizes the intensity distribution of the fluorescence Y at each of the light modulators 4R and 4G, which are illumination receiving areas.

A tapered rod having a cross-sectional area that changes along the light traveling direction may be used as the angle converter 52. Using a tapered rod as the angle converter 52 also provides the same effect provided by using a CPC.

As described above, the first light source apparatus 20 according to the present embodiment outputs the fluorescence Y generated in the wavelength conversion member 50 as the yellow illumination light WL.

Effects of Embodiment

The light guiding unit 100 according to the present embodiment provides the effects below.

The light guiding unit 100 according to the present embodiment includes the light guiding member 51 and the angle converter 52. The light guiding member 51 has the side surfaces 50c and the first end surface 50a. The angle converter 52 includes the light incident section 52a, on which the light from the light guiding member 51 is incident, the light exiting section 52b, via which the light having entered the angle converter 52 exits, and the reflection section 52c, which reflects the light incident via the light incident section 52a toward the light exiting section 52b. The refractive index of the interior of the angle converter 52 is greater than the refractive index of air. The refractive index of the interior of the light guiding member 51 is greater than the refractive index of the interior of the angle converter 52. The first end surface 50a and part of the side surfaces 50c of the light guiding member 51 are buried in the light incident section 52a of the angle converter 52.

The light guiding unit 100 according to the present embodiment allows the number and area of interfaces normals to which extend in different directions and which are created between the wavelength conversion member 50 and the angle converter 52 to be increased because the first end surface 50a and part of the side surfaces 50c of the light guiding member 51 are buried in the light incident section 52a of the angle converter 52. The amount of light caused to enter the angle converter 52 can thus be increased as compared with the configuration in which the light guiding member 51 is not buried in the angle converter 52. The light having exited out of the light guiding material 51 (fluorescence Y) can therefore be efficiently extracted.

In the light guiding unit 100 according to the present embodiment, the light guiding member 51 is the wavelength conversion member 50, which converts the excitation light E incident thereon into the fluorescence Y having a wavelength band different from that of the excitation light E.

The configuration described above allows the light guiding unit 100 to efficiently extract the fluorescence Y generated by the wavelength conversion member 50.

In the light guiding unit 100 according to the present embodiment, the length L1 of the buried section 56 of the side surfaces 50c, which is the section buried in the light incident section 52a, is shorter than the length L2 of the first end surface 50a.

The configuration described above prevents the buried section 56 from being buried by too large amount. The fluorescence Y having exited out of the angle converter 52 is thus allowed to efficiently enter the illumination homogenizing optical system 102.

In the light guiding unit 100 according to the present embodiment, the angle converter 52 has a cross-sectional area that intersects the optical axis J and increases in the direction from the light incident section 52a toward the light exiting section 52b.

According to the configuration described above, the light incident via the light incident section 52a changes its orientation while traveling in the angle converter 52 in such a way that the direction of the light approaches the direction parallel to the optical axis J whenever the light is totally reflected off the reflection section 52c. That is, the angle converter 52 parallelizes the fluorescence Y and outputs the parallelized fluorescence Y via the light exiting section 52b.

In the light guiding unit 100 according to the present embodiment, the light guiding member 51 is bonded to the angle converter 52 via the optical adhesive 55, and at least part of the light incident section 52a of the angle converter 52 is formed of the optical adhesive 55.

According to the configuration described above, joining the light guiding member 51 to the angle converter 52 via the optical adhesive 55 allows the configuration in which part of the light guiding member 51 is buried in the angle converter 52 to be readily manufactured. Further, since the optical adhesive 55 is provided so that no air layer is present at the interface between the light guiding member 51 and the angle converter 52, optical loss due to the reflection at the interface of the air layer can be reduced.

In the light guiding unit 100 according to the present embodiment, the optical adhesive 55 has a refractive index equal to the refractive index of the interior of the angle converter 52 or a refractive index having a value at least between the refractive index of the interior of the light guiding member 51 and the refractive index of the interior of the angle converter 52.

The configuration described above can reduce optical loss due to reflection at the interface between the light guiding member 51 or the angle converter 52 and the optical adhesive 55.

The first light source apparatus 20 according to the present embodiment includes the light guiding unit 100 and the light source 101, which outputs light to the light guiding member 51.

The first light source apparatus 20 according to the present embodiment can efficiently extract the fluorescence Y generated by the light guiding unit 100 and can therefore be a light source apparatus having high light utilization efficiency.

The projector according to the present embodiment includes the first light source apparatus 20 and the second light source apparatus 21, the light modulators 4R, 4G, and 4B, which modulate the light from the first light source apparatus 20 and the second light source apparatus 21 in accordance with image information, and the projection optical apparatus 6, which projects the light modulated by the light modulators 4R, 4G, and 4B.

The projector 1 according to the present embodiment, which includes the first light source apparatus 20 and the second light source apparatus 21 described above, has excellent light utilization efficiency.

First Variation

Figure 6:
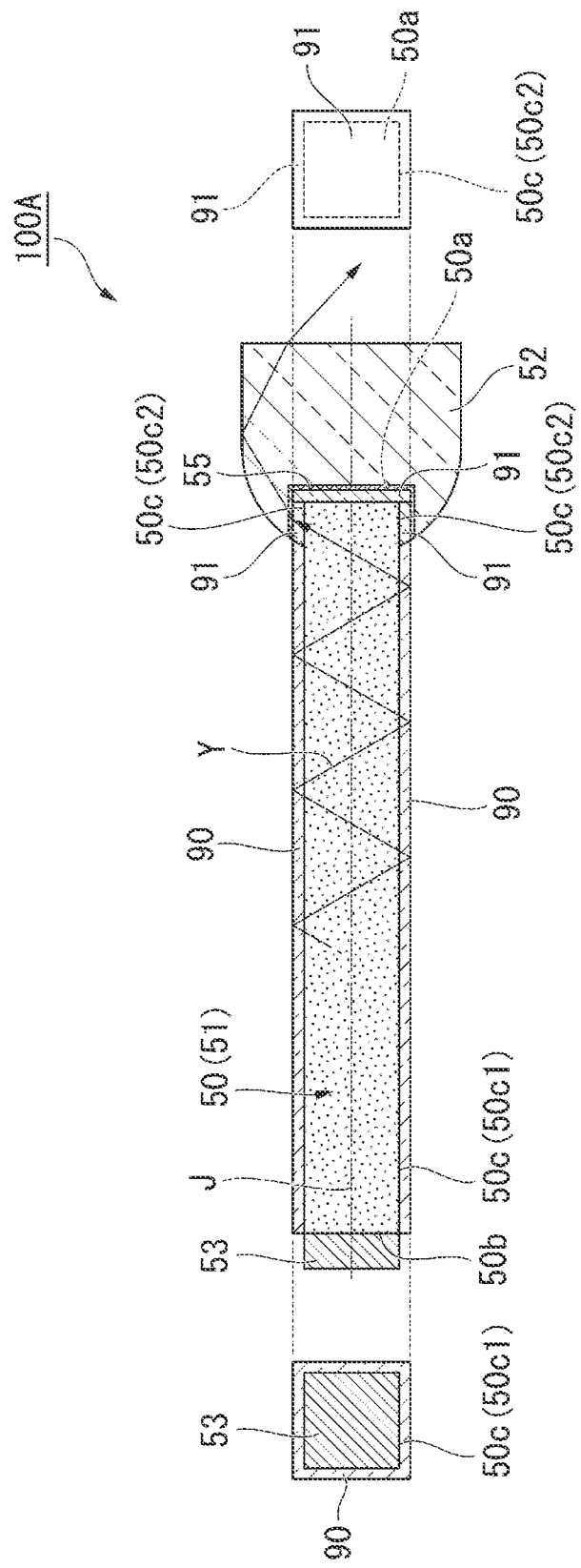
FIG. 6 shows the configuration of a light guiding unit according to a first variation.

FIG. 6 shows the configuration of a light guiding unit according to a first variation. In FIG. 6, components common to those in FIG. 2 have the same reference characters and will not be described. In FIG. 6, to simplify the figure, plan views of the wavelength conversion member of the light guiding unit viewed in the direction of the optical axis J are also presented at opposite ends of the light guiding unit in the longitudinal direction.

In a light guiding unit 100A according to the present variation, a first antireflection film 90 and a second antireflection film 91 are formed on the surface of the wavelength conversion member 50, as shown in FIG. 6.

The first antireflection film 90 is so characterized as to prevent reflection of the excitation light E and increase the excitation light E passing therethrough. The first antireflection film 90 is formed on a first section 50c1 of the side surfaces 50c that is the section not buried in the light incident section 52a of the angle converter 52. The first antireflection film 90 is, for example, a magnesium fluoride layer or a silicon oxide layer. The first antireflection film 90 may instead be a dielectric multilayer film formed of low refractive index layers and high refractive index layers alternately layered on each other. In this case, the low refractive index layers are made, for example, of magnesium fluoride or silicon oxide. The high refractive index layers are made, for example, of tantalum oxide, titanium oxide, or niobium oxide.

The first antireflection film 90 may not be formed, for example, on a side surface 50c that does not face any of the light sources 101 out of the four side surfaces 50c. In this case, the side surface 50c on which the first antireflection film 90 is not provided can be used, for example, as a holding member attachment surface to which a holding member that holds the light guiding unit 100 in a housing (not shown) of the first light source apparatus 20 is attached.

The second antireflection film 91 is so characterized as to transmit the fluorescence Y. The second antireflection film 91 is formed on a second section 50c2 of the side surfaces 50c that is a section buried in the light incident section 52a of the angle converter 52 and on the first end surface 50a.

According to the light guiding unit 100A according to the present variation, the first antireflection film 90 formed on the first section 50c1 of the side surfaces 50c suppresses reflection of the excitation light E at the surface of the wavelength conversion member 50. The excitation light E is thus allowed to efficiently enter the wavelength conversion member 50. The second antireflection film 91 is, for example, a magnesium fluoride layer or a silicon oxide layer. The second antireflection film 91 may instead be a dielectric multilayer film formed of low refractive index layers and high refractive index layers alternately layered on each other. In this case, the low refractive index layers are made, for example, of magnesium fluoride or silicon oxide. The high refractive index layers are made, for example, of tantalum oxide, titanium oxide, or niobium oxide.

Further, in the light guiding unit 100A, the second antireflection film 91 formed on the second section 50c2 of the side surfaces 50c and the first end surface 50a suppresses reflection of the fluorescence Y at the interface between the wavelength conversion member 50 and the angle converter 52. The fluorescence Y is thus allowed to efficiently enter the angle converter 52.

Second Variation

Figure 7:
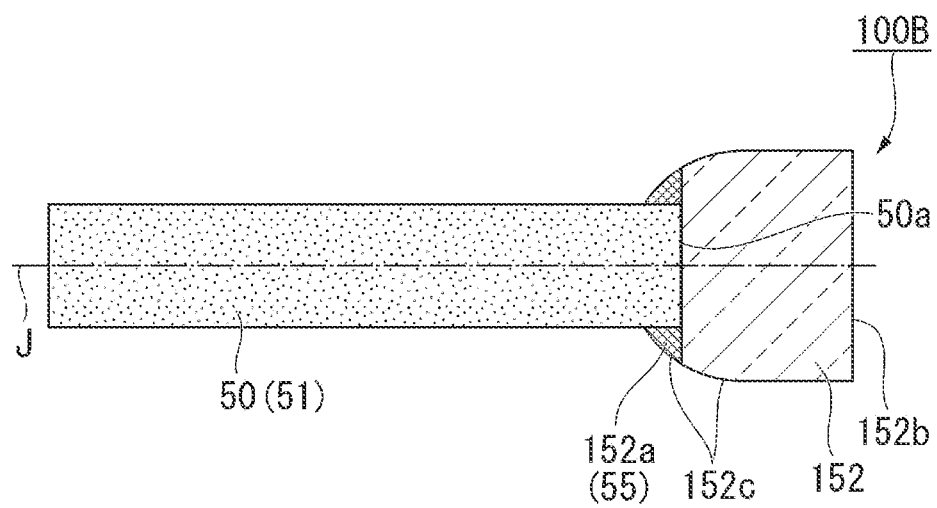
FIG. 7 shows the configuration of a light guiding unit according to a second variation.

FIG. 7 shows the configuration of a light guiding unit according to a second variation. In FIG. 7, components common to those in FIG. 2 have the same reference characters and will not be described.

In a light guiding unit 100B according to the present variation, at least part of a light incident section 152a and part of a light reflection section 152c of an angle converter 152 are formed of the optical adhesive 55, as shown in FIG. 7.

Figure 8:
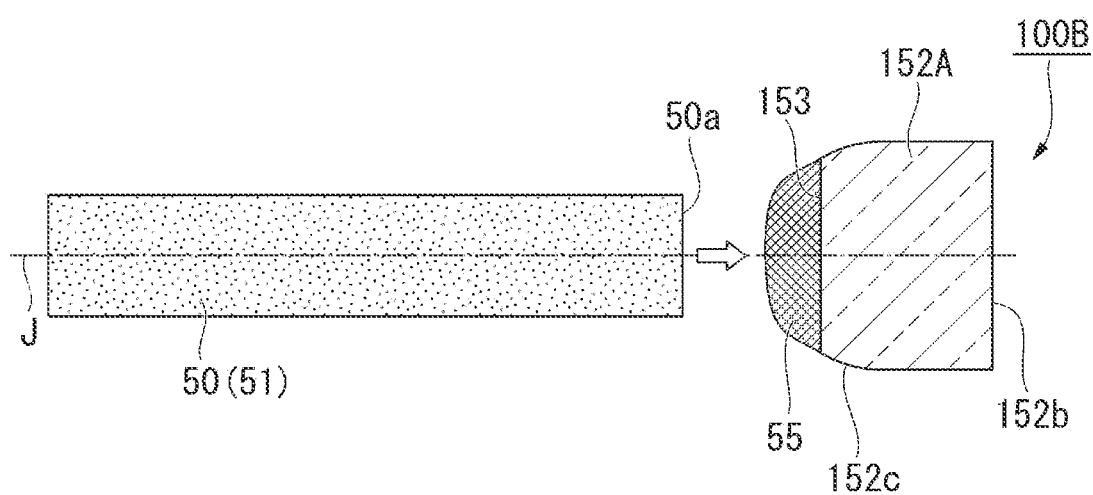
FIG. 8 shows the step of manufacturing the light guiding unit according to the second variation.

FIG. 8 shows the step of manufacturing the light guiding unit. Specifically, FIG. 8 shows the step of joining the wavelength conversion member 50 to the angle converter 152.

First, an optical part 152A, which includes a light exiting section 152b, part of the reflection section 152c, and a flat surface 153, is prepared, and an appropriate amount of optical adhesive 55 is applied to the flat surface 153 of the optical part 152A, as shown in FIG. 8. Thereafter, the wavelength conversion member 50 is inserted into the optical adhesive 55 so that the first end surface 50a presses the flat surface 153, and the optical adhesive 55 is cured so that the surface of the optical adhesive 55 forms the remainder of the part of the reflection section 152c. The configuration shown in FIG. 7, in which the light guiding member 51 is buried in the angle converter 152, can thus be manufactured.

The light guiding unit 100B according to the present variation, in which the wavelength conversion member 50 presses the flat surface 153, facilitates the alignment of the wavelength conversion member 50 with the optical part 152A. The step of manufacturing the light guiding unit 100B can therefore be simplified.

The technical scope of the present disclosure is not limited to the embodiment described above, and a variety of changes can be made thereto to the extent that the changes do not depart from the substance of the present disclosure.

For example, the above embodiment has been described with reference to the case where the wavelength conversion member 50 and the angle converter 52 or 152 are bonded to each other via the optical adhesive 55, and a structure in which the wavelength conversion member 50 and the angle converter 52 or 152 are not bonded to each other but are so held as to be in contact with each other may instead be employed.

The above embodiment and variations have been described with reference to the case where the wavelength conversion member 50 is used as the light guiding member 51, and the present disclosure is also applicable to a light guiding unit using a no-phosphor-containing rod lens as the light guiding member.

The above embodiment has been described with reference to the case where the light source apparatus according to the present disclosure is used in a transmissive projector, and the light source apparatus according to the present disclosure can also be used in a reflective projector. The term "transmissive" used herein means that a liquid crystal light valve including a liquid crystal panel or any other component transmits light. The term "reflective" used herein means that the liquid crystal light valve reflects light. The light modulators are each not limited to a liquid crystal light valve and may, for example, be a digital micromirror device.

The above embodiment has been described with reference to a projector using three liquid crystal panels, and the present disclosure is also applicable to a projector using only one liquid crystal light valve and a projector using four or more liquid crystal light valves.

The above embodiment has been described with reference to the case where the light source apparatus according to the present disclosure is incorporated in a projector, but not necessarily. The light source apparatus according to the present disclosure may be used as a lighting instrument, a headlight of an automobile, and other components.

A light guiding unit according to an aspect of the present disclosure may have the configuration below.

A light guiding unit according to a first aspect of the present disclosure includes a light guiding member that light enters and an angle converter that the light from the light guiding member enters. The light guiding member has a side surface and a light exiting end surface which intersects the side surface and via which the light exits. The angle converter includes a light incident section on which the light from the light guiding member is incident, a light exiting section via which the light incident on the angle converter exits, and a reflection section that reflects the light incident via the light incident section toward the light exiting section. The refractive index of the interior of the angle converter is greater than the refractive index of air. The refractive index of the interior of the light guiding member is greater than the refractive index of the interior of the angle converter. The light exiting end surface and part of the side surface of the light guiding member are buried in the light incident section of the angle converter.

In the light guiding unit according to the first aspect of the present disclosure, the light guiding member may be a wavelength conversion member that converts the light incident thereon into light having a wavelength band different from the wavelength band of the incident light.

In the light guiding unit according to the first aspect of the present disclosure, the length of a buried section of the side surface that is the section buried in the light incident section may be shorter than the length of the light exiting end surface.

In the light guiding unit according to the first aspect of the present disclosure, the light guiding member may be bonded to the angle converter via an adhesive member, and at least part of the light incident section of the angle converter may be formed of the adhesive member.

In the light guiding unit according to the first aspect of the present disclosure, part of the reflection section of the angle converter may be formed of the adhesive member.

In the light guiding unit according to the first aspect of the present disclosure, the adhesive member may have a refractive index having a value between the refractive index of the interior of the light guiding member and the refractive index of the interior of the angle converter.

In the light guiding unit according to the first aspect of the present disclosure, the light guiding member may include a first antireflection film and a second antireflection film different from the first antireflection film, with the first antireflection film formed on a first portion of the side surface that is the portion not buried in the light incident section, and the second antireflection film formed on a second portion of the side surface that the portion buried in the light incident section and on the light exiting end surface.

In the light guiding unit according to the first aspect of the present disclosure, the angle converter may have a cross-sectional area that intersects the optical axis and increases in the direction from the light incident section toward the light exiting section.

A light source apparatus according to a second aspect of the present disclosure includes the light guiding unit according to the first aspect described above and a light source that outputs light to the light guiding member.

A projector according to a third aspect of the present disclosure includes the light source apparatus according to the second aspect described above, a light modulator that modulates light from the light source apparatus in accordance with image information, and a projection optical apparatus that projects the light modulated by the light modulator.

What is claimed is:

1. A light guiding unit comprising:
a light guiding member that light enters; and
an angle converter that the light from the light guiding member enters,
wherein the light guiding member has a side surface and a light exiting end surface which intersects the side surface and via which the light exits,
the angle converter includes
   a light incident section on which the light from the light guiding member is incident,
   a light exiting section via which the light incident on the angle converter exits, and
   a reflection section that reflects the light incident via the light incident section toward the light exiting section,
   a refractive index of an interior of the angle converter is greater than a refractive index of air,
a refractive index of an interior of the light guiding member is greater than the refractive index of the interior of the angle converter,
the light exiting end surface and part of the side surface are in contact with the angle converter,
wherein the light guiding member includes a first antireflection film and a second antireflection film,
the first antireflection film is formed on a first portion of the side surface that is a portion not buried in the light incident section, and
the second antireflection film is formed on a second portion of the side surface that is a portion buried in the light incident section and on the light exiting end surface.

2. The light guiding unit according to claim 1,
wherein the light guiding member is a wavelength conversion member that converts the light incident thereon into light having a wavelength band different from a wavelength band of the incident light.

3. The light guiding unit according to claim 1,
wherein a length of a portion of the side surface that is a portion in contact with the angle converter is shorter than a length of the light exiting end surface.

4. The light guiding unit according to claim 1,
wherein the light guiding member is bonded to the angle converter via an adhesive member, and
at least part of the light incident section of the angle converter is formed of the adhesive member.

5. The light guiding unit according to claim 4,
wherein part of the reflection section of the angle converter is formed of the adhesive member.

6. The light guiding unit according to claim 4,
wherein the adhesive member has a refractive index having a value between the refractive index of the interior of the light guiding member and the refractive index of the interior of the angle converter.

7. The light guiding unit according to claim 1,
wherein the angle converter has a cross-sectional area that intersects an optical axis and increases in a direction from the light incident section toward the light exiting section.

8. A light source apparatus comprising:
the light guiding unit according to claim 1; and
a light source that outputs light to the light guiding member.

9. A projector comprising:
the light source apparatus according to claim 8;
a light modulator that modulates light from the light source apparatus in accordance with image information; and
a projection optical apparatus that projects the light modulated by the light modulator.

* * * * *

UNITED STATES PATENT AND TRADEMARK OFFICE
CERTIFICATE OF CORRECTION

PATENT NO. : 11,669,006 B2
APPLICATION NO. : 17/463634
DATED : June 6, 2023
INVENTOR(S) : Hidefumi Sakata and Yuichiro Iwama Page 1 of 1

It is certified that error appears in the above-identified patent and that said Letters Patent is hereby corrected as shown below:

On the Title Page

Item (73), please change the Assignee from "Seiko Epson Corportation, Tokyo (JP)" to "Seiko Epson Corporation, Tokyo (JP)".

Signed and Sealed this
Fifth Day of September, 2023

Katherine Kelly Vidal
*Director of the United States Patent and Trademark Office*